United States Patent [19]

Slavik et al.

[11] 4,355,984
[45] Oct. 26, 1982

[54] TEACHING DEVICE

[75] Inventors: William H. Slavik, Palos Hills; William P. Carlson, Chicago; Michael J. McGowan, Downers Grove, all of Ill.

[73] Assignee: Nuvatec, Inc., Lombard, Ill.

[21] Appl. No.: 133,850

[22] Filed: Mar. 25, 1980

[51] Int. Cl.³ .............................. G09B 7/02; G09B 7/06
[52] U.S. Cl. ...................................... 434/335; 434/362
[58] Field of Search .............. 434/322, 323, 335, 353, 434/354, 356, 357, 358, 359, 362

[56] References Cited

U.S. PATENT DOCUMENTS 3,919,788 11/1975 Ingeneri ............................ 434/362
3,953,929 5/1976 Hansel .
4,118,876 10/1978 Brilakis ............................... 434/335

Primary Examiner—Russell E. Adams
Attorney, Agent, or Firm—Hume, Clement, Brinks, Willian & Olds. Ltd.

[57] ABSTRACT

A teaching device includes a reading station provided with six on-off switches for automatically sensing a text key encoded as a pattern of punched holes in a text book. The teaching device automatically generates an answer key from the text key by means of a pseudo-random number generator which is run using the text key as a seed. The text book includes a number of multiple choice questions in which the correct answer corresponds to the answer designated in the answer key.

24 Claims, 6 Drawing Figures

TEACHING DEVICE

BACKGROUND OF THE INVENTION

The present invention relates to improvements in teaching devices of the type which evaluate multiple choice questions to aid self instruction.

The advantages of interactive teaching devices are well recognized. One class of these devices provides a number of multiple choice questions to be answered by the user as he proceeds through a course of study. Generally, the course of study will include textual material as well as a number of multiple choice questions. By answering the questions and then checking his answers, the user can check his level of comprehension.

SUMMARY OF THE INVENTION

The present invention is directed to an improved teaching device which automatically determines the accuracy of proposed answers to multiple choice questions.

According to one feature of this invention, a teaching device is provided with means for automatically sensing an encoded text key associated with the text book in use, as well as means for automatically generating an answer key in response to the text key. This answer key provides a sequence of correct answers, which sequence is used in determining whether proposed answers selected by the user are correct. The invention is also directed to a text book having an encoded text key for use with such a teaching device. In the presently preferred embodiment, the text key is encoded as a pattern of perforated and unperforated regions arranged along a strip on one margin of one of the pages of the text. In this way, the teaching device can be easily programmed to recognize the correct answers for each separate text with a minimum of user intervention.

According to a second feature of the invention, the teaching device includes means for registering a text key and means for automatically performing a calculation based on the text key to generate an answer key indicative of a sequence of correct answers. In the presently preferred embodiment, the text key is supplied as a seed to a pseudo-random number generator. In this way, a relatively short text key can be used to generate a large number of potentially infinite series of randomly distributed correct answers. For example, a simple six bit binary text key can specify 64 different answer keys, each of which is independent from the others, apparently random, and of whatever length desired. Furthermore, this approach minimizes requirements for computer memory, since it requires much less memory to store a program for a pseudo-random number generator ("PRNG") than it does to store all the answer keys that can be generated with that PRNG.

The invention, together with further objects and attendant advantages, will be best understood by reference to the following detailed description taken in connection with the accompanying drawings.

DETAILED DESCRIPTION OF A PRESENTLY PREFERRED EMBODIMENT

Figure 1:
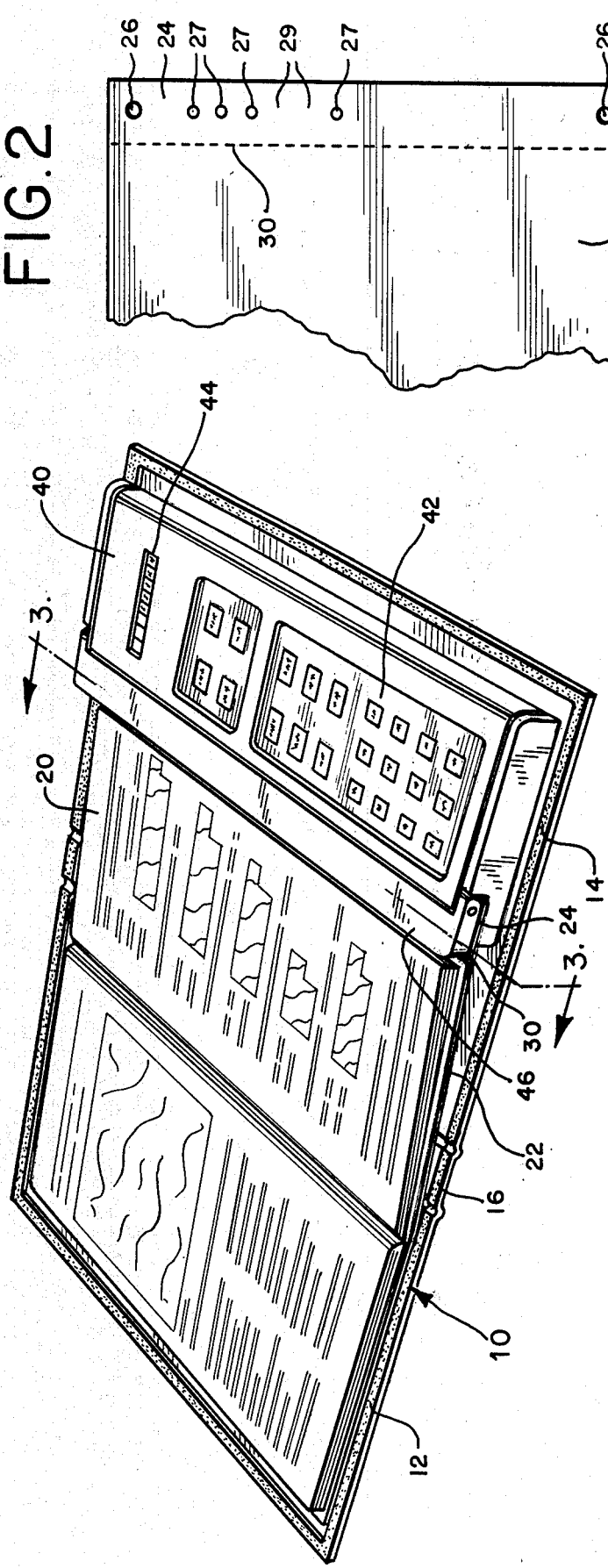
FIG. 1 is a perspective view of a presently preferred embodiment of the present invention.

Referring now to the drawings, FIG. 1 shows a perspective view of a presently preferred embodiment of the invention. This embodiment includes a binder 10 having a front cover 12, a back cover 14, and a spine section 16. The covers 12, 14 are flexibly mounted to the spine section 16 to allow the binder to fold up from the open position shown in FIG. 1 to a closed position (not shown) in which the front cover 12 extends over and generally parallel to the back cover 14.

Attached to the back cover 14 is a self-teaching module 40 which includes a keyboard 42, a digital display 44, and a text key reading station 46. The reading station 46 is adapted to receive a portion of a text book 20 and to automatically sense a six-bit digital text key encoded thereon. The structure and operation of the reading station 46 will be described in detail below in connection with FIG. 3.

FIG. 1 shows a text 20 positioned with a portion 24 of the text 20 in the reading station 46, ready for use. When not in use, the text 20 can be readily disengaged from the reading station 46, closed, and stored in a pocket (not shown) provided on the inside of the front cover 12. Then the binder 10 can be closed and easily carried or stored, like an ordinary binder.

Preferably, the text book 20 contains study materials as well as a number of multiple choice questions intersperced with the text. As used herein the term "multiple choice question" is to be understood as including true-false questions. Each question is followed by a number of possible answers. If a question is a true-false question then of course there are two possible answers. If the question is a multiple choice question, then five possible answers are provided.

Figure 2:
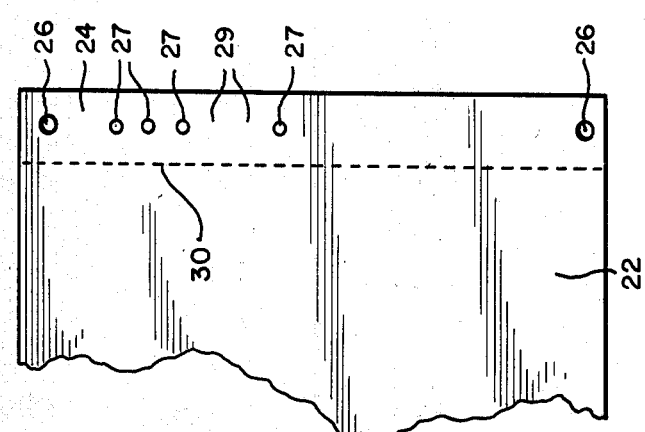
FIG. 2 is a detailed view of a portion of the text book shown in FIG. 1.

FIG. 2 shows a plan view of a portion of the back page 22 of the text book 20. As used herein, the term "text book" is used to include books, booklets, leaflets, and single page structures which include a number of multiple choice questions, whether or not in conjunction with study materials; such study materials may include printed matter, audio recordings and visual recordings. The term "page" is meant to include covers as well as pages, whether or not thicker or less flexible than pages.

The back page 22 includes a flap 24 extending along the outer marginal edge. This flap 24 is connected to the page 22 at a fold line 30 and is foldable between a retracted position, in which the flap 24 does not extend substantially beyond the remaining pages of the text book 20, and an extended position, in which the flap 24 extends as shown in FIG. 2. In this embodiment, the fold line 30 is positioned to substantially coincide with the outer edges of the remaining pages (not shown in FIG. 2).

The flap 24 is provided with two registration holes 26, one at either end of the flap 24. These registration holes 26 are used to precisely align the flap 24 in the reading station 46. The flap 24 is also provided with a set of six digital indicia 27, 29 which encode the text key, a six bit binary number. In this embodiment, these indicia include perforated regions 27 and unperforated regions 29, which in combination encode the six binary number. By altering the pattern of perforations, the indicia 27, 29 can be made to encode any binary number between zero and 63 (decimal).

Figure 3:
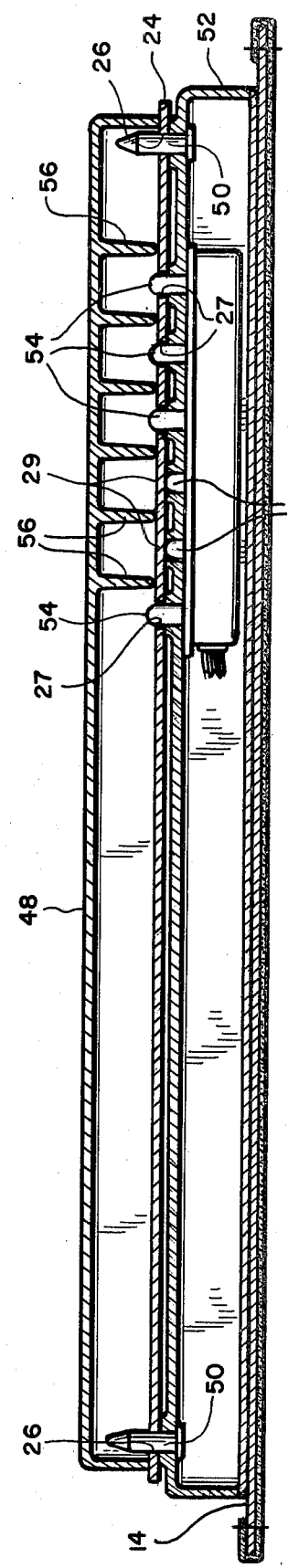
FIG. 3 is a cross sectional view taken along line 3—3 of FIG. 1.

FIG. 3 shows a cross-sectional view of the reading station 46, showing the flap 24 in place. The reading station 46 includes a lower housing 52 and a hinged cover 48. The cover 48 is mounted to rotate with respect to the lower housing 52 about an axis parallel to the fold line 30 of the flap 24. The cover 48 moves between an open position (not shown) in which the flap 24 can be inserted in or removed from the reading station 46 and a closed position (shown in FIG. 3) in which the flap 24 is firmly held in position. Two registration pins 50 are mounted on the lower housing 52 to pass through the registration holes 26 in the flap 24, and thereby to align the flap 24 precisely in the reading station.

In addition, six mechanical on/off switches 54 are mounted on the lower housing 52, positioned to sense the presence or absence of perforated regions 27 in the flap 24. The cover 48 includes a number of ribs 56 positioned to press the flap 24 toward the lower housing 52 between the switches 54. As shown in FIG. 3, four of the switches 54 extend through perforated regions 27 while two of the switches 54 are depressed by unperforated regions 29 pressed against the switches 54 by the ribs 56. These switches 54 physically sense the six-bit text key encoded in the physical pattern of the digital indicia 27, 29 and generate in response thereto a digital pattern of switch closures. As will be explained below, this pattern of switch closures in turn generates a text signal which is used by the teaching module.

The presently preferred embodiment utilizes mechanical switches 54 to sense the text key. Those skilled in the art will recognize that other means can be used to record and automatically sense the text key. For example, the text key can be encoded as an optical pattern of either light and dark regions or translucent and opaque regions, and the reading station can employ light sources and photo-diodes or photo-transistors to sense the optical pattern. Alternately, the text key can be encoded and sensed magnetically. Of course, the length of the text key can be readily chosen to provide the desired number of distinct text keys. In addition, the text key can be placed at other positions on the text book 20.

Figure 4:
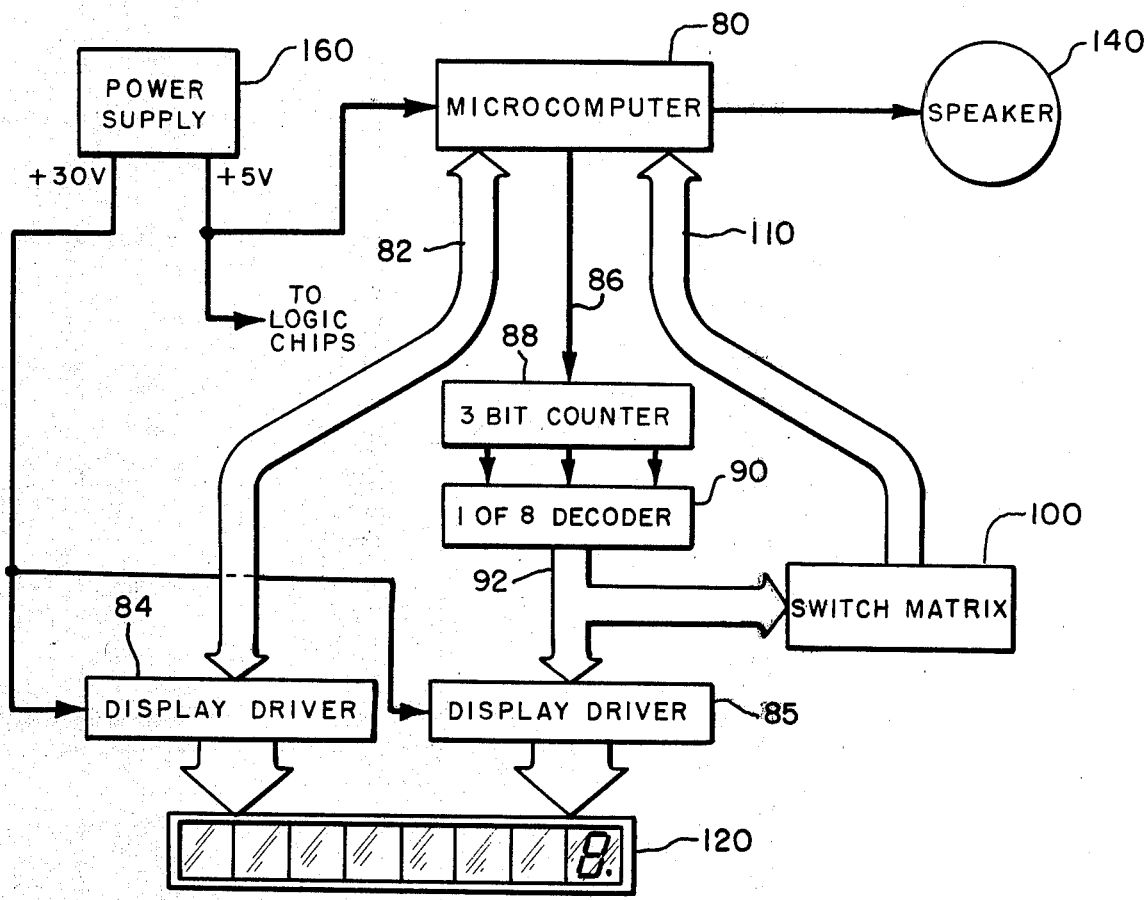
FIG. 4 is block diagram of the electronic circuitry of the embodiment of FIG. 1.

Turning now to FIG. 4, the major electronic components of this embodiment include a microcomputer 80 which receives input signals from a switch matrix 100 and supplies output signals to drive a digital display 120, the switch matrix 100, and a speaker 140. A power supply 160 supplies a DC voltage at +5 volts to power the microcomputer 80 and other logic chips as well as a DC voltage at +30 volts to power the display 120.

In this embodiment, the microcomputer 80 is an AIM-65 including 4 kilobytes of Ramdom Access Memory, ("RAM"), marketed by Rockwell International. The program for the microcomputer 80 is shown in assembly language in Table 1, and its operation is discussed below. The digital display 120 is preferably an eight-digit, vacuum type seven-segment fluorescent display marketed by Futaba as type number 9-ST11. The microcomputer 80 selects which of the seven segments are to be illuminated in an individual digit via an 8 bit segment output bus 82 which is connected via a display driver 84 to the display 120. The individual digit being addressed is selected by the microprocessor 80 via output line 86 which is applied as an input to a three-bit counter 88 in order to step the counter 88 repetitively from zero to seven. Output signals from the counter 88 are applied to a 1-of-8 decoder 90, which then applies a signal to one of eight lines in control bus 92, depending on the number encoded in the output signals of the counter 88. In this way, the microcomputer 80 can sequentially address each of the eight digits in the display 120 via driver 85. In this preferred embodiment, the microcomputer 80 is programmed to step through the display at a rate of about two milliseconds per digit so that the entire display is updated every 16 milliseconds. In this preferred embodiment the counter 88 and the decoder 90 are part numbers SN7493 and SN74145, respectively, marketed by Texas Instruments and the drivers 84, 85 are part numbers DI-514, marketed by Dionics.

Figure 5:
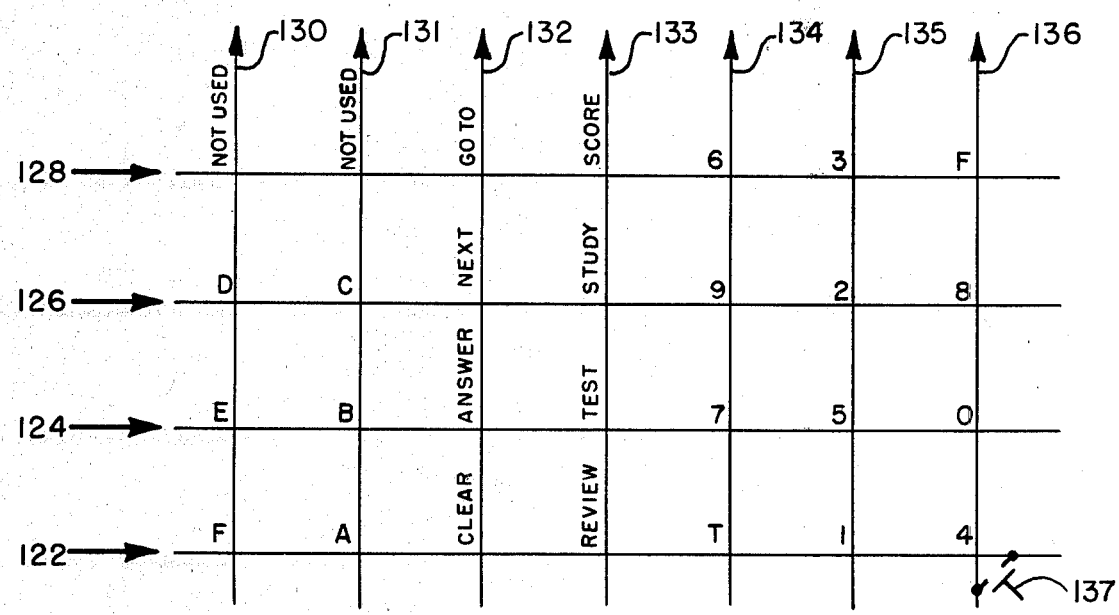
FIG. 5 is a detailed schematic diagram of a portion of the circuitry shown in FIG. 4.

In addition, lines 1 through 4 of the control bus 92 are used to drive a switch matrix 100. A detailed view of the switch matrix 100 is shown in FIG. 5, in which lines 1 through 4 of the control bus 92 are indicated by reference number 122, 124, 126, 128, respectively. As previously mentioned, the decoder 90 operates to sequentially place an output signal on each of the lines of the control bus 92. Simultaneously, the microcomputer 80 is programmed to monitor lines on the eight-bit switch input bus 110 for signals. Seven of these lines are indicated by reference number 130-136 in FIG. 5. For example, when the decoder 90 places an output signal on line 122, the microcomputer registers a signal on line 130 as indicating closure of switch "F." Switch 137 is a schematic representation of the switches placed at each matrix mode which is in use.

Figure 6:
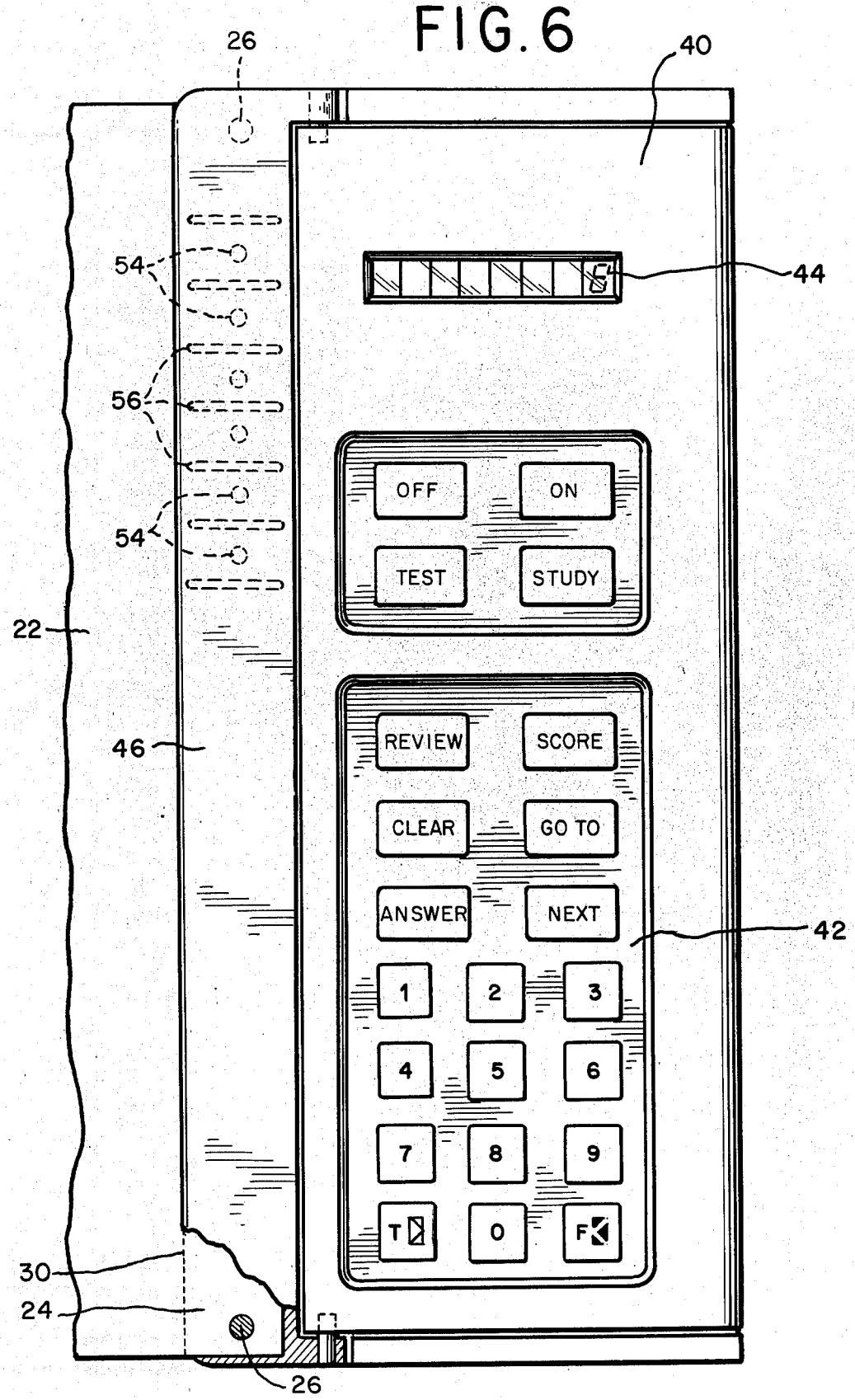
FIG. 6 is a partial top view of the embodiment of FIG. 1.

FIG. 5 shows the 26 switch inputs. Here the symbols A, B, C, D, E and F at the extreme left hand edge of the matrix represent the reading station switches 54. The remaining nodes of the matrix correspond to the keyboard of the module 40. The arrangement of this keyboard is shown in detail in FIG. 6. As will be explained below, the keyboard switches 0-9, T and F are used by the user to enter proposed answers, the remaining keyboard switches are used by the user to control the operation of the microcomputer 80, and the display 120 is used by the microcomputer 80 to prompt the user and to display results.

The program of the microcomputer is listed in assembly language in Table 1. This listing provides a detailed description of the program. The following discussion presents a general description of the organization and operation of the program of Table 1.

When power is first applied or a new text key is supplied, the microcomputer first executes an initialization routine. In this initialization routine, the variable QN, which stores the current question number being processed, is set equal to 101. In addition, the program includes registers for each question, which registers are used to record the correctness of answers proposed by the user. During initialization, each of these registers is set to indicate incorrect responses.

In addition, certain parameters are calculated from the text key for later use by the program. The program of Table 1 utilizes a pseudo-random number generator (PRNG) to generate an answer key which designates the correct answer for each question in a series indicated by the text key. Pseudo-random number generators are well known to those skilled in the art. *The Art of Computer Programming Semi-Numerical Algorithms,*

Vol. 2, by Donald Knuth, contains a discussion and several algorithms for pseudo-random number generators. In general, PRNG's are calculational routines which take an input number, called a seed, perform a calculation on the seed, and return a resulting value. The program of Table 1 is written to utilize a PRNG which accepts a six-bit seed and produces a six-bit resulting value. In addition, this PRNG produces a correct answer signal between 1 and 5; this signal is obtained by decoding the six-bit resulting value. For example, a resulting value between 1 and 13 can correspond to a correct answer signal of 1, a resulting value between 14 and 26 can correspond to a correct answer signal of 2, and so forth. By calling the PRNG repetitively, supplying the text signal as the seed for the first call and the resulting value from the previous call as the seed for the next call, a sequence of correct answer signals can be generated. The PRNG is chosen such that this sequence of correct answer signals is apparently substantially random, and a unique series of correct answer signals is generated for each seed used in the first call of the PRNG. Of course, a given text signal always results in the same sequence of correct answer signals, which corresponds to the correct answers for the questions of the textbook bearing that text signal.

During the initialization routine the PRNG is called repetitively, starting with the six-bit text key as a seed. The PRNG resulting values for each series (question 100, 200, . . . 900) are stored in RAM. As explained below, these values are used in determining the correct answer for any question between question number 101 and question number 999.

After the initialization a prompt message is displayed asking whether the user intends to work in the text mode or the study mode. The microcomputer repeatedly monitors the keyboard until either the TEST or the STUDY key is pressed by the user. Then a flag for either the test mode or the study mode is set, depending on which button was pressed. If the test mode has been selected the current value of QN is saved as an indication of the start of the test.

At this point the microcomputer 80 displays the question number currently being processed as well as a prompt message. The program then samples the keyboard and branches, depending on which key is registered by the microcomputer. Seven different branches are provided, as follows.

NEXT—If the NEXT key is registered, QN is incremented and QN is checked to see if the high order digit has changed, indicating a transition, such as from 199 to 200. If so, and the program is in the test mode, the score is automatically calculated and displayed as explained below, and the test or study prompt is again displayed. If in the study mode, the program merely returns to the test or study prompt. If the high order digit of QN is unchanged the program merely displays the incremented question number and waits for a new key.

SCORE—If the SCORE key is registered, the program calculates and displays the score, if in the test mode, or simply displays the last test score, if in the study mode. Then the program waits for another key. As explained below, the program records the accuracy of the proposed answer for each question while in the test mode. In order to display the score, the program simply indicates the number of correct answers and the number of total possible correct answers between the start of the test and the current question number. For example, one possible score is the message "7 of 9".

STUDY—If the STUDY key is registered while the program is in the study mode, the program continues to wait for another key. If the STUDY key is registered in the test mode, the program sets the study mode flag and then displays the question number and prompt message.

TEST—If the TEST key is registered while the program is in the test mode, the program continues to wait for another key. If the TEST key is registered in the study mode the program saves the current value of QN as the test start, sets the test mode flag, and then waits for another key.

GOTO—If the GOTO key is registered the program displays a prompt message and waits for additional keys. Keys 0-9 cause the program to save and display the key and to wait for additional keys. When three keys are registered, the program saves the three digit number as the new value of QN, and displays the new QN and a prompt message. The CLEAR key can be used to erase any partial entry of the new QN.

0-9, T, F—If one of these keys is registered, the program displays the entry and then waits for another key. The CLEAR key will cause the displayed entry to be blanked while the ANSWER key will cause the displayed entry to be registered as an answer signal indicative of a proposed answer.

The correct answer is then obtained by first getting the previously stored seed for the series of the current question. For example, if the current question number is 239, the appropriate previously stored seed is that for question 200. As previously explained, these previously stored seeds were generated by repeatedly executing the PRNG using the text key as the initial seed. Thus, the seed for question 200 (the 200 series) is obtained by executing the PRNG 200 times, starting with the text key as the initial seed. The previously stored seed for the current series is then supplied to the PRNG as a seed, and the PRNG is repetitively called the appropriate number of times to generate the answer key for the current question. In the above example involving question 239, the PRNG would be called 39 times, starting with the seed generated by the PRNG at the 200th execution of the PRNG. As previously explained, the PRNG generates a number between 1 and 5. If the current question is a 5 choice multiple choice question, the number generated by the PRNG indicates the correct answer. If the question is a true-false multiple choice question, two of the possible outputs of the PRNG (such as 1 and 2 for example) indicate that the correct answer is "True" and the remaining possible outputs (such as 3-5) indicate that the correct answer is "False".

The proposed answer is then compared with the correct answer as defined by the answer key to determine whether or not it is correct. If in the test mode, the appropriate register for the current question is then set to indicate whether the proposed answer was correct or not, and the program then waits for another key to be registered. If in the study mode, the program displays an appropriate feedback signal to indicate to the user whether the proposed answer is correct or not. If the proposed answer is correct, the program waits for another key to be registered. If the proposed answer is incorrect, the program waits for a CLEAR key or a NEXT key. If the CLEAR key is registered, the program clears the display, and then waits for another key to be registered. If the NEXT key is registered, the program increments QN as described above.

REVIEW—If the REVIEW key is registered while in the test mode, the program automatically calculates and displays the score as explained above and sets the study mode flag. If the REVIEW key is registered a second time the program displays the question number of the first missed question in the test along with a prompt message and then waits for a proposed answer. After a proposed answer is entered, the program immediately evaluates the correctness of the proposed answer and supplies the user with an appropriate feedback message. The program will accept multiple proposed answers, giving appropriate feedback in each case. The user can advance to the next missed question by depressing the REVIEW key again.

The program also includes a monitoring routine that reads the text signal from the switches 54 periodically, each time the switch matrix is read. The text signal is automatically compared with the text signal previously in use. If the two are not identical, the program automatically resets and reinitializes in order to prevent an inaccurate answer key from being used. The text signal corresponding to no perforations is not a legitimate text signal, but is instead taken to indicate the absence of a text book in the reading station.

Having described the structure and programming of this preferred embodiment, its operation can now be discussed. To begin, the cover 48 of the reading station 46 is opened and the flap 24 is positioned with the registration holes 26 over the registration pins 50. Then the cover 48 is closed to cause the flap 24 to impose the text key on the digital switches 54. The ON key is pressed to supply power to the module 40, and the display comes up with the prompt message "S or T?" Depending on whether the TEST or STUDY key is pressed, the module enters either the test or study modes.

If the TEST key is pressed the module responds with the prompt message "101?" The user can now propose an answer to question 101 (printed in the text book) with the keyboard. The proposed answer will be displayed along with the question number. Once the user is satisfied with his proposed answer, he pushes the ANSWER key and the proposed answer is tabulated. By pressing the NEXT key the user can now advance to the next question and enter another proposed answer. This process is repeated until the end of the test is reached.

Pressing SCORE will cause the score to be calculated and displayed. After the test, the user can review his mistakes by pressing the REVIEW key. This causes the module to display the question number of the first missed question of the test. At this point the user can select and enter another proposed answer, and the display will indicate whether or not the new proposed answer is correct. The user can enter any number of proposed answers, and then advance to the next missed question by pressing the REVIEW key. Pressing the OFF key turns off the module.

If the study mode has been selected, the prompting and entry of proposed answers is as described above. However, after each answer is entered with the ANSWER key, the display immediately indicates whether the proposed answer is correct or not and the user can try multiple proposed answers on any one question. As before, the NEXT key is used to advance to the next question. In addition, the GOTO key can be used to go to any desired question number, and the CLEAR key can be used to clear the display.

From the foregoing, it should be apparent that this preferred embodiment is capable of automatically sensing a text key associated with a text book to allow the teaching device to simply and readily generate the appropriate answer key. The device utilizes a novel and advantageous method to generate the answer key from the text key with small memory requirements and yet great flexibility.

Of course, it should be understood that various changes and modifications to the preferred embodiment described herein will be apparent to those skilled in the art. For example, in alternate embodiments the program can be modified to accept a text key which is manually keyed in via the keyboard by the user in response to instructions contained in the text book. Alternately, other sensing means, such as optical or magnetic sensors, can be used in the means for automatically sensing the text key. In addition, the electronics can be miniaturized to a custom single chip which dispenses with most of the discrete logic chips shown in FIG. 4 and is battery powered. It is therefore intended that all such changes and modifications be covered by the following claims.

TABLE 1

```
;
; equates
;
?         sect    'DUMMY'
;
; v.i.a.  addresses
;
          aorg    0a000h
;
vdrb      ds      1           ; data register b
vdra      ds      1           ; data register a
vddrb     ds      1           ; data direction register b
vddra     ds      1           ; data direction register a
;
vt1cl     ds      1           ; timer 1 counter low
vt1ch     ds      1           ; timer 1 counter high
vt1ll     ds      1           ; timer 1 latch low
vt1lh     ds      1           ; timer 1 latch high
;
vt2l      ds      1           ; timer 2 low
vt2h      ds      1           ; timer 2 hi
;
vsr       ds      1           ; shift register
;
vacr      ds      1           ; auxiliary control register (acr)
vpcr      ds      1           ; peripheral control register (pcr)
vifr      ds      1           ; interrupt flag register
```

TABLE 1-continued

| | | | |
|---|---|---|---|
| vier | ds | 1 | ; interrupt enable register |

;
; monitor locations
;

| | aorg | 0a400h | ; |
|---|---|---|---|

;

| irqv2 | ds | 2 | ; interrupt request vector |
|---|---|---|---|

;
; used in program
;

| t1clk | equ | 00040h | ; timer 1 free running mode |
|---|---|---|---|
| ; | | | |
| clrint | equ | 0007fh | ; clear all interrupts |
| t1inte | equ | 000c0h | ; enable timer 1 interrupts |
| t1intf | equ | 00040h | ; timer 1 interrupt flag mask |
| ; | | | |
| cb2pls | equ | 000a0h | ; pulse cb2 when write port b (vdrb) |
| ; | | | |
| dspsiz | equ | B | ; size of the display |
| ; | | | |
| numscn | equ | 5 | ; number of scans needed for valid key entry |
| ; | | | |
| valstt | equ | 4 | ; number of states with keys |
| ; | | | |
| delcon | equ | 0c350h | ; constant for 1/20 second delay |

;
; *****
;

| inttim | equ | 2000 | ; |
|---|---|---|---|

;
; *****
;
; equates for the keys
;

| k4 | equ | 14 |
|---|---|---|
| k1 | equ | 11 |
| kt | equ | 20 |
| as | equ | 22 |
| cl | equ | 23 |
| k0 | equ | 10 |
| k5 | equ | 15 |
| k7 | equ | 17 |
| ts | equ | 24 |
| an | equ | 25 |
| k8 | equ | 18 |
| k2 | equ | 12 |
| k9 | equ | 19 |
| st | equ | 26 |
| nx | equ | 27 |
| kf | equ | 21 |
| k3 | equ | 13 |
| k6 | equ | 16 |
| sc | equ | 28 |
| gotok | equ | 29 |

;

| cs | equ | 28 |
|---|---|---|
| co | equ | 26 |
| cr | equ | 27 |
| ct | equ | 20 |
| cf | equ | 21 |
| cques | equ | 23 |
| ce | equ | 24 |
| cn | equ | 25 |
| cblank | equ | 22 |
| cu | equ | 31 |
| cd | equ | 32 |
| cy | equ | 29 |
| cp | equ | 30 |
| ca | equ | 33 |

;

| ; cb2low | equ | sound0+0c0h |
|---|---|---|
| ; cb2hi | equ | sound0+0e0h |

;

| ; sound0 | equ | cb2hi+0ch |
|---|---|---|
| ; sound1 | equ | cb2hi+0eh |

;

| cb2hi | equ | 0ch+0e0h |
|---|---|---|
| cb2low | equ | 0ch+0c0h |

;

| sound0 | equ | 0e0h+0ch |
|---|---|---|
| sound1 | equ | 0e0h+0eh |

;

TABLE 1-continued

```
hi              equ     2
lo              equ     3
                copy    'charequ. s'
; equates for the display characters
;
;
C0              equ     0FCH
C1              equ     060H
C2              equ     0DAH
C3              equ     0F2H
C4              equ     066H
C5              equ     0B6H
C6              equ     0BEH
C7              equ     0E0H
C8              equ     0FEH
C9              equ     0E6H
CT              equ     01EH
CF              equ     08EH
CBLANK          equ     000H
CQUES           equ     0CAH
CE              equ     09EH
CN              equ     02AH
C0              equ     03AH
CR              equ     00AH
CS              equ     0B6H
CY              equ     076H
CP              equ     0CEH
CU              equ     038H
CD              equ     07AH
CA              equ     0EEH
;
asmRAM:         sect    'RAM'
                copy    'asmram. s'
;
; this is the ram allocation necessary for the assembly
; language routines
;
disply          ds      8               ; display buffer
disply2         ds      8               ;
keyinp          ds      1               ; for passing the input key
percntl         ds      1
percnth         ds      1
delloop         ds      1
swtinp          ds      1               ; value of the page edge switches
keybrd          ds      8               ; used to store read-in values from keyboard
state           ds      1               ; state of the machine
tmpswt          ds      1               ; temp storage for decoding page
;                                         edge switches
sncnt           ds      1               ; for counting scans
lstkey          ds      1               ; last input key
temp            ds      1               ; just a temp storage location
;
rwres           ds      100             ; results of test 0=wrong, 1=right
;
asmROM:         sect    'ROM'
                copy    'asmini. s'
;
; this is the initialization routine
; (gets the interrupts going, blanks the display and initializes
;  all locations relevant to the assembly language routines)
;
ioinit
                sei                     ; disable interrupts
;
                lda     #0ffh           ; set up data direction regs
                sta     vddrb           ; vdrb is output
;
                lda     #00             ; vdra is input
                sta     vddra           ;
;
                lda     #cb2pls         ; cb2 pulses when write vdrb
                sta     vpcr            ; this increments the state
;
                ldx     #dspsiz         ; x = size of the display
                lda     #cblank         ;
;
clrdis
                sta     vdrb            ; blank out the display
                sta     disply-1, x     ; also the display buffer
;
                dex                     ; decrement count/index
                bne     clrdis          ; continue if not done
```

TABLE 1-continued

```
;
notst8
        lda     #cblank             ;
        sta     vdrb                ;

;
        lda     vdra                ; read the keyboard
        lsr                         ; check if lsb = 0 (state 8)
        bcs     notst8              ; no: keep looking
;
        lda     #cb2hi              ;
        sta     vpcr                ;
;
        lda     #01                 ; ok: next is state 1
        sta     state               ;
;
        lda     #{lo, scnint}       ; initialize interrupt vector
        sta     irqv2               ;
        lda     #{hi, scnint}       ;
        sta     irqv2+1             ;
;
        lda     #clrint             ; want to monitor timer 1 only
        sta     vier                ; so disable other interrupts
;
        lda     #t1inte             ; enable timer 1 interrupts
        sta     vier                ;
;
        lda     #t1clk              ; set timer 1 up as free running
        sta     vacr                ; continuous interrupts
;
        lda     #{lo, inttim}       ; initialize timer 1
        sta     vt1cl               ;
        lda     #{hi, inttim}       ;
        sta     vt1ch               ;
;
        cli                         ; enable interrupts
;
        lda     #000h               ; initializes switches to "no book"
        sta     swtinp              ; for basic
;
        rts                         ; return
;
        copy    'asmint. s'
;
; this is the display/keyboard interrupt handler
;
scnint
        pha                         ; save a-reg
        txa                         ; save x-reg
        pha                         ;
        tya                         ; save y-reg
        pha                         ;
;
        lda     vt1cl               ; zero interrupt flag
;
        ldx     state               ; x = state (which disp char)
        lda     disply-1, x         ; get next char
        tay                         ; do decode
        lda     dspcod-10, y        ;
        sta     vdrb                ;
;
        lda     #cb2low             ;
        sta     vpcr                ;
;
        nop                         ;
;
        lda     #cb2hi              ;
        sta     vpcr                ;
;
        lda     dspcod-10, y        ;
        sta     vdrb                ;
;
        lda     vdra                ; read keyboard
        sta     keybrd-1, x         ; save it
;
        lsr                         ; check if hardware sees state 8
        bcc     hrdchk              ; yes (lsb = 0)
;
        cpx     #08                 ; not yet so check if we think
                                    ; it is state 8 or greater
        bcc     nots8               ; not yet so no problem ; oops: out of sync
```

TABLE 1-continued

```
;
hrdchk
        jsr     getswt          ; update page edge switches
;
        ldx     #00             ; so state becomes 1
;
nots8
        inx                     ; increment state
        stx     state           ;
;
        pla                     ; restore y-reg
        tay                     ;
        pla                     ; restore x-reg
        tax                     ;
        pla                     ; restore a-reg
;
        rti                     ; return from interrupt
;
getswt
        lda     #00             ; zero out temporary location
        sta     tmpswt          ;
;
        ldy     #03             ; offset into keyboard array
                                ; (also an offset and count)
;
        ldx     #05             ; number of shifts
;
get2bt
        txa                     ; save bit shift count
        pha                     ;
;
        lda     #006h           ; want page edge switches
        and     keybrd, y       ; from keyboard reads
;
doasl
        asl                     ; shift over
        dex                     ; decrement shift count
        bne     doasl           ; more shifts
;
        ora     tmpswt          ; combine with previous byte
        sta     tmpswt          ; and remember
;
        pla                     ; now decrement bit shift count
        tax                     ;
;
        dex                     ; by 2
        dex                     ;
;
        dey                     ; decrement word count/offset by 1
        bne     get2bt          ; if more then continue
;
        lda     tmpswt          ; take computed value
        lsr                     ; adjust (because of space saving algorithm)
        lsr                     ;
        eor     #03fh           ; flip bits
        cmp     swtinp          ; see if same (no book change)
        bne     newbook         ; nope — new book !!
        rts                     ; same book — all is well
newbook:
        ldx     swtinp          ; check for 00 switches (no book)
        beq     gotabook        ; were looking for a book
        jmp     start           ; wow! fast book change
gotabook:
        sta     swtinp          ; save switches value
        rts                     ; return
;
        copy    'asmscn. s'
;
; this routine checks the result of the keyboard scans
;
getkey
        jsr     gets8            ; find end of s8
;
notclr
        lda     #numscn          ; number of scans for validity
        sta     scncnt           ; for counting
;
nxtscn
        jsr     gtnos8           ; look for not s 8
        jsr     gets8            ; find s 8
;
        jsr     chkkey           ; check for a key
```

TABLE 1-continued

```
;
            bne     notclr          ; got a key still pressed
;
            dec     scncnt          ; not key so dec count
            bne     nxtscn          ; need a 0
;
nokey
            lda     #00             ; want a "no match"
            sta     lstkey          ; for last key
;
doscan
            jsr     gtnos8          ; want full scan
            jsr     gets8           ;
;
            jsr     chkkey          ; check for key
            beq     nokey           ; no key
;
            cmp     lstkey          ;
            beq     chkval          ; same key so check if valid yet
;
            sta     lstkey          ; new key
;
            lda     #numscn—1       ;
            sta     scncnt          ;
;
            bne     doscan          ; ***** always true *****
;
chkval
            dec     scncnt          ; decrement count
            bne     doscan          ; not yet valid
;
            sta     keyinp          ; all done
;
            txa                     ;
            pha                     ;
;
            jsr     savedisp        ;
            ldx     #00             ;
            jsr     disclr          ;
            jsr     gets8           ;
            jsr     gets8           ;
;
            pla                     ;
            tax                     ;
;
; sounds
;
            lda     percntl_tbl, x  ;
            sta     percntl         ;
            lda     percnth_tbl, x  ;
            sta     percnth         ;
            lda     delloop_tbl, x  ;
            sta     delloop         ;
;
            sei                     ; no interrupts please
;
            lda     #CBLANK         ; blank out last character of display
            sta     vdrb            ;
;
            jsr     sound           ;
;
            cli                     ; let the interrupts proceed
;
            lda     keyinp          ;
;
            rts                     ; return
;
chkkey
            ldx     #valstt         ; number of valid states (with keys)
;
chkstt
            ldy     #08             ; bit count
;
            lda     keybrd—1, x     ; get results of a scan
            ora     nulmsk—1, x     ; show invalid bits as "not pressed"
;
chkbit
            lsr                     ; check a bit
            bcc     gotkey          ; 0 = pressed
;
            dey                     ; decrement bit count
            bne     chkbit          ; not done
;
```

TABLE 1-continued

```
                dex                     ; decrement state count
                bne     chkstt          ; not done
;
                lda     #00             ; no keys pressed
                rts                     ; return "eq"
;
gotkey
                dex                     ; decrement state for indexing
                txa                     ;
                asl                     ; mult by 8
                asl                     ;
                asl                     ;
;
                dey                     ; decrement bit count for indexing
                sty     temp            ; need to add to a
;
                clc                     ; carry = 0
                adc     temp            ; got an index
;
                tax                     ; for indexing
                lda     keycod, x       ; get keycode
                rts                     ; and condition code
;
gets8
                lda     vdra            ; look for state 8
                lsr                     ; low bit = 0
                bcs     gets8            ; no
                rts                     ; yes
;
gtnos8
                lda     vdra            ;
                lsr
                bcc     gtnos8          ;
                rts                     ;
;
                copy    'asmsnd. s'
;
delcon2:        equ     0005
;
sound:
sound3:
sound2:
                lda     #sound1         ;
                sta     vpcr            ;
;
                jsr     snddelay        ;
;
                lda     #sound0         ;
                sta     vpcr            ;
;
                jsr     snddelay        ;
;
                dec     percentl
                bne     sound2          ;
;
                dec     percenth        ;
                bne     sound3          ;
;
                rts                     ;
;
snddelay
                ldx     delloop         ; loop 20 times
sett2
                lda     #{lo, delcon2}  ; load t2 with delay constant
                sta     vt2l
                lda     #{hi, delcon2}
                sta     vt2h
                lda     #20h            ; for bit test
waitt2
                bit     vifr            ; timer done?
                beq     waitt2          ; no, keep waiting
                dex                     ; decrement counter
                bne     sett2           ; not 0, keep going
                rts                     ; done, return
;
                copy    'asmtbl. s'
;
keycod
                db      kf, k3, k6, sc, gotok
                db      0,0,0
                db      k8, k2, k9, st, nx
                db      0,0,0
```

TABLE 1-continued

```
            db      k0, k5, k7, ts, an
            db      0,0,0
            db      k4, k1, kt, as, cl
            db      0,0,0
;
; table of 7-segment codes for displaying characters
dspcod
            db      C0, C1, C2, C3, C4
            db      C5, C6, C7, C8, C9
            db      CT, CF, CBLANK, CQUES, CE
            db      CN, CO, CR, CS, CY
            db      CP, CU, CD, CA
;
nulmsk
            db      07,07,07,07
;
; tables for sounds
;
percentl_tbl
            db      03fh,03fh,03fh,01,01
            db      0,0,0
            db      03fh,03fh,03fh,01,01
            db      0,0,0
            db      03fh,03fh,03fh,01,01
            db      0,0,0
            db      03fh,03fh,03fh,01,01
            db      0,0,0
;
percnth_tbl
            db      2,2,2,2,2
            db      0,0,0
            db      2,2,2,2,2
            db      0,0,0
            db      2,2,2,2,2
            db      0,0,0
            db      2,2,2,2,2
            db      0,0,0
;
delloop_tbl
            db      5,6,6,5,5
            db      0,0,0
            db      6,6,6,5,5
            db      0,0,0
            db      6,6,6,5,5
            db      0,0,0
            db      6,6,5,5,5
            db      0,0,0
;
;
;
;
; disclr clears the display from position x to position 7
;   needs x
;   destroys a, x
;
;
            sect    'ROM'
;
disclr
disclr1
disclr2
            lda     #cblank
            sta     disply, x           ; display a blank
            inx
            cpx     #8                  ; done?
            bne     disclr2             ; no do some more
;
            rts
;
;
; htod converts a hex number in a into 2 decimal digits.
; msd returned in x, lsd returned in y.
;
htod
            sta     save                ; save it
            and     #0fh                ; and off msd
            cmp     #0ah                ;
            bcc     lowok               ; if lsd is less than a, lsd is ok
            sec
            sbc     #0ah                ; else, subtract a from lsd
            clc
            adc     #10h                ; make it look like decimal
```

TABLE 1-continued

```
lowok
         pha                         ; save it
         lda    save                 ; get original # back
         lsr                         ; get rid of higlow digit
         lsr
         lsr
         lsr
         sta    save                 ; save it
         sed                         ; set decimal
         clc
         adc    save                 ; a=2*msd
         sta    save                 ; save it
         clc
         adc    save
         sta    save                 ; double again: save = 4*msd
         clc
         adc    save
         sta    save                 ; save = 8*msd
         clc
         adc    save
         sta    save                 ; save = 16*msd
         pla                         ; restore lsd
         clc
         adc    save                 ; add them together
         sta    save                 ;
         cld                         ; clear decimal
         and    #0fh                 ; and off high digit
         tay                         ; save in y
         lda    save                 ; restore #
         lsr                         ; get rid of lo digit
         lsr
         lsr
         lsr
         tax                         ; save in x
         rts
;
; dtoh converts decimal to hex
;   needs least sig. digit in y, msd in x
;   returns hex number in a
;
;
dtoh
         tya                         ; lo digit
         inx                         ; adjust for test
         bne    do10s                ; always true
loop:
         clc                         ; carry = 0
         adc    #10                  ; mult by 10
do10s:
         dex                         ; check for more 10s
         bne    loop                 ; yup
         sta    counter              ;
         lda    counter              ; yes, we're done
         rts
;
; delay
;    delays for 1 second
;    used by score display, test set and study set
;
delay
         ldx    #20                  ; loop 20 times
sett2
         lda    #{lo, delcon}        ; load t2 with delay constant
         sta    vt2l
         lda    #{hi, dlecon}
         sta    vt2h
         lda    #20h                 ; for bit test
waitt2
         bit    vifr                 ; timer done?
         beq    waitt2               ; no, keep waiting
         dex                         ; decrement counter
         bne    sett2                ; not 0, keep going
         rts                         ; done, return
;
savedisp
         ldx    #08                  ; 8 bytes
saveloop
         lda    disply−1, x          ;
         sta    disply2−1, x         ;
;
         dex                         ;
         bne    saveloop             ;
```

TABLE 1-continued

```
;
            rts                         ;
;
restdisp
            ldx     #08                 ;
restloop
            lda     disply2−1,x         ;
            sta     disply−1,x          ;
;
            dex                         ;
            bne     restloop            ;
;
            rts                         ;
;
;
; goto key
;
            list    1
;
            sect    'ROM'
;
goto
            lda     #cques              ; display a "?"
            sta     disply
            ldx     #01
            jsr     disclr              ; clear rest of display
            ldx     #0ffh               ; init save areas
            ldy     #0ffh
inp3
            jsr     phxy
            jsr     getkey              ;
            jsr     plxy                ;
            cmp     #cl                 ; clear key?
            beq     goto                ; yes, start again
            pha                         ;
            jsr     phxy                ;
            jsr     restdisp            ;
            jsr     plxy                ;
            pla                         ;
            cmp     #kt
            bcs     inp3                ; if not a #, start again
            cpx     #0ffh               ; 1st digit?
            bne     dig2                ; no, try 2nd digit
            cmp     #11                 ; was the key "1"?
            bcc     inp3                ; no, less, then invalid key
            sta     disply+1            ; yes, display it
            sec
            sbc     #10                 ; decode char
            tax                         ; save it
            jmp     inp3                ; get another
dig2
            cpy     #0ffh               ; 2nd digit?
            bne     dig3                ; no, try 3rd
            sta     disply+2            ; yes, display it
            sec
            sbc     #10                 ; decode
            tay                         ; save
            jmp     inp3                ; get next char
dig3
            sta     disply+3            ; display it
            sec
            sbc     #10                 ; decode
            sta     qn+2                ; save it
            sty     qn+1                ; store 2nd digit
            txa
            pha                         ; save new series num
            ldx     qn+1                ; load for conversion to hex
            ldy     qn+2
            jsr     dtoh                ; convert to hex
            sta     offset              ; store
            pla
            cmp     qn                  ; series change?
            beq     gtdone              ; no, goto is done
            sta     qn                  ; yes, store it
            lda     modefl              ; what mode
            beq     gtretn              ; study, then goto is done
            jsr     cscore              ; test, then calc & disp score
gtretn
            lda     #00                 ; forget last test
            sta     lq
            sta     fq                  ; zero test boundaries
```

TABLE 1-continued

```
                lda     #{lo, dpsort}       ; set return to dpsort
                sta     subrtn
                lda     #{hi, dpsort}
                sta     subrtn+1
                rts
gtdone
                sta     qn                  ; store series num
                lda     #{lo, qdisp}        ; set return to qdisp
                sta     subrtn
                lda     #{hi, qdisp}
                sta     subrtn+1
                rts
;
;
;
                list    1
;
                sect    'ROM'
;
next
                inc     offset              ; increment qust. #
                lda     offset              ; for comparison
                cmp     #64h                ; > = 64h?
                bcs     newsn               ; yes, new series number
                lda     #{lo, qdisp}
                sta     subrtn
                lda     #{hi, qdisp}
                sta     subrtn+1            ; return to qdisp
                rts                         ; return
newsn
                lda     #01                 ; make qn = 01
                sta     offset
                inc     qn                  ; increment series num.
                lda     qn
                cmp     #0ah                ; still in bounds?
                bcc     inbnd               ; yes
                lda     #01
                sta     qn                  ; no, set back to 1
inbnd
                lda     modefl              ; check mode
                beq     donenx              ; study--done
                jsr     cscore              ; calculate, display score
                lda     #00                 ; forget last test
                sta     fq
                sta     lq                  ; zero out test boundaries
donenx
                lda     #{lo, dpsort}       ; set return to dpsort
                sta     subrtn
                lda     #{hi, dpsort}       ;
                sta     subrtn+1
                rts
;
;
;
;
; clear key just returns to qdisp
;
                list    1
;
                sect    'ROM'
;
clear
                lda     #{lo, qdisp}
                sta     subrtn
                lda     #{hi, qdisp}
                sta     subrtn+1
                rts
;
; answer key is invalid. return to qndisp
;
answer
                lda     #{lo, qndisp}
                sta     subrtn
                lda     #{hi, qndisp}
                sta     subrtn+1
                rts
;
;
;
; *****
; page 0 allocation
; *****
page0_global sect 'PAGE0'
```

TABLE 1-continued

```
;
ansptr          ds      2
;
; *****
;
; ram allocation
;
; *****
ram_global sect 'RAM'
;
fq:
                ds      1
lq:
                ds      1
modefl:
                ds      1
offset:
                ds      1
qn:
                ds      3
resp:
                ds      1
revfl:
                ds      1
rvptr:
                ds      1
save:
counter:
                ds      1
scorsv:
                ds      8
subcall:
                ds      2
subrtn:
                ds      2
SEED:
SEEDS:
swsave:
                ds      1       ; seed for series 000
                                ; also SEED for this book
                ds      9       ; seeds for series 100-900
;
;
;       handle review (*) key
;
                list    1
                sect    'ROM'
review
                lda     lq
                beq     ret         ; no test, so return
                lda     revfl       ; has a review been started?
                bne     rev         ; yes
                jsr     cscore2     ; no, calc & display score while
                jsr     getkey      ; getting a key
                cmp     #as         ; 2nd *?
                beq     rev         ; yes, start review
                pha                 ; save key
                lda     #{lo, inp2a}
                sta     subrtn      ; no, return to handle the key
                lda     #{hi, inp2a}
                sta     subrtn +1
                pla                 ; return key
                rts                 ; return
rev
                lda     #01
                sta     revfl       ; set review-started flag
                lda     #00
                sta     modefl      ; force study mode
                lda     rvptr
                cmp     fq          ; check position of rvprt
                bcs     chklq       ; rvptr > = fq, check lq
                lda     fq          ; else, its out of bounds.
                sta     rvptr       ; set to first question
                jmp     set         ; start checking
chklq
                cmp     lq
                beq     set         ; rvptr = lq, its ok
                bcc     set         ; rvptr < lq, its ok
                lda     fq          ; else, its out of bounds
                sta     rvptr       ; reset it.
set
                ldx     rvptr       ; use x to index rwres
```

TABLE 1-continued

```
look
          lda     rwres, x
          beq     foundw          ; byte is 0, quest was wrong
          inx                     ; else, increment indexes
          inc     rvptr
          lda     lq
          cmp     rvptr           ; rvptr past lq?
          bcc     nomore          ; yes, done reviewing
          jmp     look            ; no, look some more
foundw
          stx     offset          ; offset = rvptr
          cpx     lq              ; check if this is the last ques.
          beq     nomore2         ; yes
          inc     rvptr           ; increment for next time through
          jmp     ret             ; do the question over
nomore
          lda     lq
          sta     offset
          inc     offset          ; current question = lo +1
nomore2:
          lda     #00
          sta     rvptr           ; clear rvptr
          sta     revfl           ; clear review started flag
ret
          lda     #{lo, qdisp}    ; return to qdisp
          sta     subrtn
          lda     #{hi, qdisp}
          sta     subrtn +1
          rts
;
;
;
          list    1
;
          sect    'ROM'
;
score
          lda     lq              ; check last question
          beq     return          ; if 0, no test has been taken
          lda     modefl
          beq     mfclr           ; study mode, just display
          jsr     cscore          ; else, calculate score
mfclr
          lda     #01
          jsr     dscore          ; display score
return
          lda     #{lo, qdisp}    ; set return to qdisp
          sta     subrtn
          lda     #{hi, qdisp}
          sta     subrtn+1
          rts
;
; cscore calculates the score
;
cscore2
          lda     #00
          beq     cscore3         ; always true
;
cscore
          lda     #01
cscore3:
          pha                     ;
          lda     lq              ; check to see if there is a test
          beq     notest          ; no, return
          lda     #00
          ldx     fq              ; start at 1st quest. in test
          sed                     ; keep score in decimal
addlp
          clc
          adc     rwres, x        ; add up answers in rwres
          inx                     ; point to next response
          cpx     lq              ; at last question?
          beq     addlp           ; yes, do one more
          bcc     addlp           ; not yet, keep going
          cld                     ; clear decimal
; save <score> of <#attempted> in scorsv for displaying score
          pha                     ; save # right
          lsr                     ; shift msd down to lsd
          lsr
          lsr
          lsr
          clc
```

TABLE 1-continued

```
            adc     #10             ; get char code for digit
            sta     scorsv          ; save char
            pla
            and     #0fh            ; "and" off msd
            clc
            adc     #10             ; get char code
            sta     scorsv+1        ; save it
            lda     #cblank         ; get a blank
            sta     scorsv+2
            sta     scorsv+5        ; display "of"
            lda     #co
            sta     scorsv+3        ;
            lda     #cf
            sta     scorsv+4
            lda     lq              ; find # attempted
            sec
            sbc     fq
            clc                     ;
            adc     #01             ;
            jsr     htod            ; convert to decimal
            txa                     ; msd into a
            clc
            adc     #10             ; get char code
            sta     scorsv+6        ; store
            tya                     ; lsd into a
            clc
            adc     #10
            sta     scorsv+7        ; store
            pla
;
; dscore displays the score held in scorsv
;
dscore
            pha
            lda     lq              ; any attempted?
            beq     notest          ; no, don't display
            jsr     dispscore       ; do display
            pla                     ;
            beq     nodelay         ;
            jsr     delay           ; delay 1 second
nodelay
            pha
notest
            pla
            rts
;
dispscore:
            ldx     #08             ; for x = 0 to 7
translp
            lda     scorsv-1, x
            sta     disply-1, x     ; transfer scorsv to disply
            dex
            bne     translp
            rts
;
;
;
; start up for sp
;
            list    1
;
            sect    'ROM'
;
start
            ldx     #0ffh
            txs                     ; init stack pointer
            cld
            jsr     ioinit          ; initialize hardware
            ldx     #00             ;
            jsr     disclr          ; clear display
            lda     #cr
            sta     disply+2        ; display 'ready'
            lda     #ce
            sta     disply+3
            lda     #ca
            sta     disply+4
            lda     #cd
            sta     disply+5
            lda     #cy
            sta     disply+6
start2:
```

TABLE 1-continued

```
ckswit
        lda     swtinp          ; check switches
        sta     swsave          ; save them
        beq     ckswit          ; keep looking till not 0
;
; initialize seeds for series
;
        lda     #00             ; initialize to ques 000
        sta     qn              ;
        sta     offset          ;
;
        ldx     #1              ; start with series 100 seed
;
moreseries:
notserstart:
        jsr     phxy            ; save x-reg
        jsr     RAND            ; get a random number
        jsr     plxy            ; restore x-reg
        pha                     ; save answer from RAND
        inc     offset          ; increment answer number
        lda     offset          ; check for wrap to next series
        cmp     #100            ;
        bne     notnewseries    ; not new series
        lda     #00             ; initialize to new series
        sta     offset          ;
        inc     qn              ;
notnewseries:
        pla                     ; restore answer
        cpx     qn              ; check if new series
        bne     notserstart     ; not yet
        sta     SEEDS,x         ; yes - save it
        inx                     ; check if more series to do
        cpx     #10             ;
        bne     moreseries      ; more to do
;
        lda     #01
        sta     qn              ; init series number to 1
        lda     #01
        sta     offset          ; init. offset to 1
        lda     #00
        sta     lq              ; init. last question to 0
        sta     fq              ; init. first question to 0
        sta     rvptr           ; init review pointer to 0
        sta     revfl           ; init review flag to 0
dpsort
inpst
        ldx     #00             ; start for 00
        jsr     disclr          ; clear display
;
        lda     #cs
        sta     disply          ; display "s or t"
        lda     #co
        sta     disply+2
        lda     #cr
        sta     disply+3
        lda     #ct
        sta     disply+5
        jsr     getkey          ; get a key
        cmp     #score          ; score key?
        bne     ckmode          ; no, check mode
        jsr     dscore          ; yes, display score
        jmp     dpsort          ; back to s or t
ckmode
        cmp     #ts             ; test key?
        bne     ckstdy          ; no, check study
        jsr     tstset          ; yes, set up test key
        jmp     qdisp           ; display question
ckstdy
        cmp     #st             ; study key?
        bne     ckgt            ; no, check goto
        jsr     sdyset          ; yes, set up study mode
ckgt
        cmp     #gotok          ; goto key?
        bne     inpst           ; no, key is invalid, get another
        jmp     notnum          ; handle goto key
qdisp
        ldx     #00
        jsr     disclr          ; clear display
qndisp
        lda     offset
        jsr     htod            ; convert offset to qn
        stx     qn+1            ; store decimal quest. #
```

TABLE 1-continued

```
               sty     qn+2
               ldx     #03
loop1
               lda     qn−1, x
               clc
               adc     #10             ; set up to output number
               sta     disply−1, x     ; store in display
               dex
               bne     loop1           ; get next number
               lda     #cques
               sta     disply+4        ; display ?
; main key input loop
;
keylp
inp2
               jsr     getkey          ; get a key
inp2a
               cmp     #as             ; key < * key?
               bcs     notnum          ; no, then not a # key
               jsr     callnum         ; yes, call the t/f/# routine
               jmp     (subrtn)        ; jump to return point
notnum
               sbc     #as             ; adjust to get table offset
               asl                     ; double it
               tax
               lda     calltbl, x      ; get routine address
               sta     subcall         ; store in subcall
               lda     calltbl+1, x    ; get lo byte
               sta     subcall+1
               jsr     call            ; call the routine
               jmp     (subrtn)        ; jump to the addr. in subrtn
callnum
               pha                     ; save key
               lda     #{lo, tfnum}    ; lo byte of tfnum
               sta     subcall
               lda     #{hi, tfnum}    ; hi byte of tfnum
               sta     subcall+1       ; into subcall
               pla                     ; restore key
call
               jmp     (subcall)       ; jump to loc. in subcall
;
; table of key handler routines
;
calltbl
               dw      review          ; * key
               dw      clear           ; clear key
               dw      test
               dw      answer
               dw      study
               dw      next
               dw      score
               dw      goto
;
;
               list    j
;
               sect    'ROM'
;
study
               lda     modefl          ; check modeflag
;              beq     notval          ; if clear, key is invalid
               jsr     sdyset
notval
               lda     #{lo, qdisp}
               sta     subrtn
               lda     #{hi, qdisp}
               sta     subrtn+1        ; return to qdisp
               rts
;
; set up study mode
;
sdyset
               lda     #00
               sta     modefl          ; clear modefl
               ldx     #00
               jsr     disclr          ; clear display
               lda     #cs
               sta     disply+1        ; display "study"
               lda     #ct
               sta     disply+2
               lda     #cu
               sta     disply+3
```

TABLE 1-continued

```
              lda      #cd
              sta      disply+4
              lda      #cy
              sta      disply+5
              jsr      delay
              rts
;
;
;
              list     1
;
              sect     'ROM'
;
test
              lda      modefl              ; check mode flag
              bne      ignore              ; if set, ignore key
              jsr      tstset              ; else, set up test mode
ignore
              lda      #{lo, qdisp}
              sta      subrtn
              lda      #{hi, qdisp}
              sta      subrtn+1            ; set return to qdisp
              rts
tstset
              lda      #01
              sta      modefl              ; set mode flag
              lda      #00
              sta      lq                  ; set last question to 0
              sta      revfl               ;
              sta      rvptr               ;
              lda      offset              ;
              sta      fq                  ; set first question to current
              lda      #00
              ldx      #100
clrrw
              sta      rwres−1, x
              dex                          ; clear right/wrong array
              bne      clrrw
              ldx      #00
              jsr      disclr              ; clear display
              lda      #ct                 ; display "test"
              sta      disply+2
              lda      #ce
              sta      disply+3
              lda      #cs
              sta      disply+4
              lda      #ct
              sta      disply+5
              jsr      delay
              rts
;
;
; tfnum handles the true, false, and number keys
;
              list     1
;
              sect     'ROM'
;
tfnum
              pha                          ;
              jsr      restdisp            ;
              pla                          ;
;
              cmp      #11
              bcs      valid               ; if key <11, its invalid
              jmp      rto440              ; return
valid
              cmp      #16                 ;
              bcc      keyok               ; if key <16, its ok
              cmp      #kt
              bcs      keyok               ; if key > true key, its valid
              jmp      rto440              ; else, return
keyok
              sta      resp                ; store response
              lda      modefl
              bne      intest              ; branch to intest
              lda      resp                ; for study : load response
              sta      disply+4
              lda      #cblank             ;
              sta      disply+5            ; display "<resp>"
              bne      both                ; branch around display for test
intest
```

TABLE 1-continued

```
              lda     resp
              sta     disply+5        ; display response
both
              ldx     #06
              jsr     disclr          ; clear remaining display pos.
inp4
              jsr     getkey          ; get a key
              cmp     #as
              bcc     tfnum           ; if another #/t/f key, start over
              cmp     #cl
              bne     norto400        ;
              jmp     rto400          ;
norto400:
              pha                     ;
              jsr     restdisp        ;
              pla                     ;
              cmp     #an             ; answer key?
              bne     inp4            ; no, start over
              lda     modefl          ;
              beq     stmode          ; dont blank response
              lda     #cblank         ; confirm answer key pushed
              sta     disply+4        ;
stmode
;
; find correct answer from random number generator
;  leave it in accumulator
;
              jsr     RAND            ; get the random number answer for this ques
;
              pha
              lda     resp
              cmp     #kt             ; true key?
              bcc     number          ; less, so its a number
              bne     false           ; greater, so its a false key
true
              pla                     ; restore answer
              cmp     #4              ; answer = 4?
              bcc     right           ; less, so response is right
              jmp     wrong           ; else, its wrong
false
              pla                     ; restore answer
              cmp     #04             ; answer = 4?
              bcs     right           ; >= 4 is right
              jmp     wrong           ; else, wrong
number
              sec
              sbc     #10             ; decode key
              sta     resp            ; store it
              pla                     ; restore answer
              cmp     resp            ; answer = response?
              bne     wrong           ; no, resp is wrong
right
              lda     modefl          ; what mode?
              bne     testmd          ; test-jump
              lda     #cy             ; display "yes"
              sta     disply+5
              lda     #ce
              sta     disply+6
              lda     #cs
              sta     disply+7
              jmp     rto440          ; return
testmd
              lda     offset
              tax
              cmp     lq              ; current question: lq
              bcc     noact           ; current < lq, then no action
              sta     lq              ; else, set current to lq
noact
              lda     #01
              sta     rwres, x        ; mark correct in rwres
              jmp     rto440          ; return
wrong
              lda     modefl          ; check mode
              beq     stdymd          ; jump if in study
              lda     offset
              cmp     lq              ; offset: lq
              bcc     rto440          ; offset < lq, return
              sta     lq              ; else set lq to offset
              jmp     rto440
stdymd
              lda     #cn             ; display "no"
              sta     disply+5
```

TABLE 1-continued

```
               lda      #co
               sta      disply+6
rto400
               lda      #{lo, qndisp}          ; set return to qdisp
               sta      subrtn
               lda      #{hi, qndisp}
               sta      subrtn+1
               rts
rto440
               lda      #{lo,keylp}            ; set return to keylp
               sta      subrtn
               lda      #{hi,keylp}
               sta      subrtn+1
               rts
;
RAND:
               lda      qn                     ; need series number
               asl                             ; double it
               tax                             ; and use as offset
               lda      ansptrs, x             ; to a pointer
               sta      ansptr                 ; page 0 pointer for
               lda      ansptrs+1, x           ; indirect addressing
               sta      ansptr+1               ; of a correct answer
               ldy      offset                 ; now get number in series
               lda      (ansptr), y            ; and get the right answer
               and      #0fh                   ; answers stored in ascii
               rts                             ; return answer in a-reg
;
; pointers to answers
;
ansptrs:
               dw       answers+900—100
               dw       answers+100—100
               dw       answers+200—100
               dw       answers+300—100
               dw       answers+400—100
               dw       answers+500—100
               dw       answers+600—100
               dw       answers+700—100
               dw       answers+800—100
               dw       answers+900—100
;
               end
```

I claim:

1. A teaching device comprising:

means for automatically sensing an encoded text key and generating in response thereto a digital seed;

means, responsive to the seed, for automatically performing an arithmetic calculation on the seed to generate a unique set of digital answer key signals indicative of a sequence of correct answers, at least some of said correct answers corresponding to respective questions associated with said text key;

means for registering a manually generated answer signal indicative of a proposed answer to a selected one of said questions; and means for automatically comparing the manually generated answer signal with the set of answer key signals to determine whether the proposed answer corresponds to the respective correct answer.

2. The invention of claim 1 wherein the sensing means includes a plurality of digital switches positioned to read a digital text key encoded on a surface of a text book.

3. The invention of claim 2 wherein the plurality of digital switches are mechanical switches activated by a text key which includes a physical digital pattern encoded on the surface of the text book.

4. The invention of claim 2 or 3 wherein the plurality of digital switches are positioned to read a text key encoded as a strip on a marginal edge of the surface of the text book.

5. The invention of claim 2 or 3 wherein the plurality of switches are adapted to sense the presence or absence of a punched hole formed in the surface of the text book.

6. The invention of claim 1 wherein the means for performing an arithmetic calculation comprises a pseudo-random number generator and means for supplying the seed as an input signal to the pseudo-random number generator to generate the set of answer key signals.

7. A teaching device comprising in combination:

a text book;

a text key encoded on a surface of the text book;

means for automatically sensing an encoded text key and generating in response thereto a digital text signal indicative of a text key number;

means, responsive to the text signal, for automatically performing an arithmetic calculation on the text signal to generate a unique set of digital answer key signals indicative of a sequence of correct answers, at least some of said correct answers corresponding to respective questions associated with said text key;

means for registering a manually generated answer signal indicative of a proposed answer to a selected one of said questions; and means for automatically comparing the manually generated answer signal with the set of answer key signals to determine whether the proposed answer corresponds to the respective correct answer.

8. The invention of claim 7 wherein the text key is digitally encoded and the sensing means includes a plurality of digital switches positioned to read the text key.

9. The invention of claim 8 wherein the text key includes a physical digital pattern encoded on the surface of the text book and the plurality of digital switches are mechanical switches.

10. The invention of claim 8 or 9 wherein the text key is encoded as a strip on a marginal edge of the surface of the text book.

11. The invention of claim 8 or 9 wherein each of the plurality of switches is adapted to sense the presence of absence of a punched hole formed in the surface of the text book.

12. The invention of claim 7 wherein the means for performing an arithmetic calculation comprises a pseudo-random number generator and means for supplying said text signal to the pseudo-random number generator as a seed to generate the set of answer key signals.

13. A teaching device comprising:
a housing;
a plurality of digital switches mounted on the housing and arranged to sense a text key on a text book positioned adjacent the switches and to generate in response thereto a digital seed;
means, responsive to the seed, for automatically performing an arithmetic calculation on the seed to generate a set of digital answer key signals indicative of a sequence of correct answers, at least some of said correct answers corresponding to respective questions associated with said text key;
means for registering a manually generated answer signal indicative of a proposed answer to a selected one of said questions; and
means for automatically comparing the manually generated answer signal with the set of answer key signals to determine whether the proposed answer corresponds to the respective correct answer.

14. A teaching device comprising:
a housing;
a text book positioned adjaent the housing;
a text key digitally encoded on a surface of the text book;
a plurality of digital switches mounted on the housing and arranged to sense the text key and to generate in response thereto a digital seed;
means, responsive to the seed, for automatically generating a set of digital answer key signals by performing a digital calculation on the seed to generate the answer key signals, said answer key signals indicative of a sequence of correct answers, at least some of said correct answers corresponding to respective questions associated with said text key;
means for registering a manually generated answer signal indicative of a proposed answer to a selected one of said questions; and
means for automatically comparing the manually generated answer signal with a respective one of the answer key signals to determine whether the proposed answer corresponds to the respective correct answer.

15. The invention of claim 13 or 14 wherein the plurality of digital switches are mechanical switches activated by the text key, and the text key includes a physical digital pattern encoded on the surface of the text book.

16. The invention of claim 13 or 14 wherein the plurality of digital switches are positioned to read the text key, and the text key is encoded as a strip on a marginal edge of the surface of the text book.

17. The invention of claim 13 or 14 wherein each of the plurality of switches is adapted to sense the presence or absence of a punched hole formed in the surface of the text book.

18. The invention of claim 13 or 14 wherein the means for generating a set of digital answer key signals includes a pseudo-random number generator and means for supplying the seed to the pseudo-random number generator as an input signal to generate the answer key signals.

19. The invention of claim 1 or 13 or 14 wherein the means for performing a calculation comprises:
a pseudo-random number generator, responsive to a digital input signal, for generating a pseudo-random output number;
means for supplying the seed to the pseudo-random number generator as the input signal to generate a first output number representative of a first correct answer included in the sequence of correct answers;
means for supplying the first output number to the pseudo-random number generator as the input signal to generate a second output number representative of a second correct answer included in the sequence of correct answers; and
means for supplying the second output number to the pseudo-random number generator as the input signal to generate a third output number representative of a third correct answer included in the sequence of correct answers.

20. The invention of claim 1 or 13 or 14 wherein the means for performing a calculation comprises:
a pseudo-random number generator, responsive to an input signal, for generating a pseudo-random output number;
means for supplying the seed to the pseudo-random number generator as the input signal;
means for repeatedly supplying the output number to the pseudo-random number generator as the input signal to generate a sequence of output numbers, at least a plurality of which are representative of corresponding correct answers included in the sequence of correct answers.

21. A teaching device comprising:
means for registering a text key and generating in response thereto a digital text signal indicative of a text key number;
means for automatically performing a calculation based on said text signal to generate a set of digital answer key signals, said answer key signals indicative of a sequence of correct answers, at least some of said correct answers corresponding to respective multiple choice questions associated with said text key;
means for registering a manually generated answer signal indicative of a proposed answer to a selected one of said questions; and
means for automatically comparing the manually generated answer signal with a respective one of the answer key signals to determine whether the proposed answer corresponds to the respective correct answer.

22. The invention of claim 21 wherein the means for performing a calculation includes a pseudo-random number generator and means for supplying said text signal to the pseudo-random number generator as a seed to generate the set of answer key signals.

23. A teaching device comprising:

means for registering a text key and generating in response thereto a digital seed;

a pseudo-random number generator, responsive to a digital input signal, for generating a pseudo-random output number as a result of an arithmetical calculation on the input signal;

means for supplying the seed to the pseudo-random number generator as the input signal to generate a unique set of digital answer key signals, said answer key signals indicative of a sequence of correct answers, at least some of said correct answers corresponding to repective multiple choice questions associated with the text key;

means for registering a manually generated answer signal indicative of a proposed answer to a selected one of said questions; and means for automatically comparing the manually generated answer signal with a respective one of the answer key signals to determine whether the proposed answer corresponds to the respective correct answer.

24. A teaching device comprising in combination:

a text book, said text book including a plurality of page, said pages bearing a plurality of questions and a plurality of sets of possible multiple choice answers, each set of answers corresponding to a respective one of said plurality of questions;

a text key encoded as a pattern of perforated and unperforated regions positioned along a marginal portion of one of the pages;

a housing;

means for releasably holding the marginal portion in registration with the housing such that the text key is maintained in position adjacent the housing;

a plurality of mechanical switches mounted in the housing and positioned such that each of the switches is adjacent one of the perforated and unperforated regions and the switches sense the pattern of perforated and unperforated regions and generate in response thereto a binary text signal indicative of a text key number;

a computer, responsive to the text signal;

means, included in the computer, for generating a pseudo-random number as a function of a seed input signal;

means, included in the computer, for supplying the text signal to the generating means as the seed input signal to obtain a unique set of digital answer key signals, said answer key signals indicative of a sequence of correct answers, at least some of said correct answers corresponding to respective ones of said plurality of questions;

means, included in the computer, for registering a manually generated answer signal indicative of a proposed answer to a selected one of said plurality of questions; and means, included in the computer, for automatically comparing the manually generated answer signal with a respective one of the answer key signals to determine whether the proposed answer corresponds to the respective correct answer.

* * * * *

UNITED STATES PATENT AND TRADEMARK OFFICE
CERTIFICATE OF CORRECTION

PATENT NO. : 4,355,984

DATED : Oct. 26, 1982

INVENTOR(S) : William H. Slavik, William P. Carlson, Michael J. McGowan

It is certified that error appears in the above—identified patent and that said Letters Patent is hereby corrected as shown below:

Column 3, line 2, insert ---bit-- after the word "six".

Column 4, line 34, delete "mode" and insert therefor --node--.

Column 9, line 19 (Table 1), delete "B" and insert therefor --8--.

Column 45, line 12, delete "of", second occurrence, and insert therefor --or--.

Column 45, line 41, delete "adjaent" and insert therefor --adjacent--.

Signed and Sealed this

Seventeenth Day of May 1983

[SEAL]

Attest:

DONALD J. QUIGG

Attesting Officer — Acting Commissioner of Patents and Trademarks